Dec. 26, 1950     W. R. CURTIS     2,535,843
TRIM AND MITER GAUGE FOR SAW TABLES
Filed June 29, 1948     2 Sheets-Sheet 1
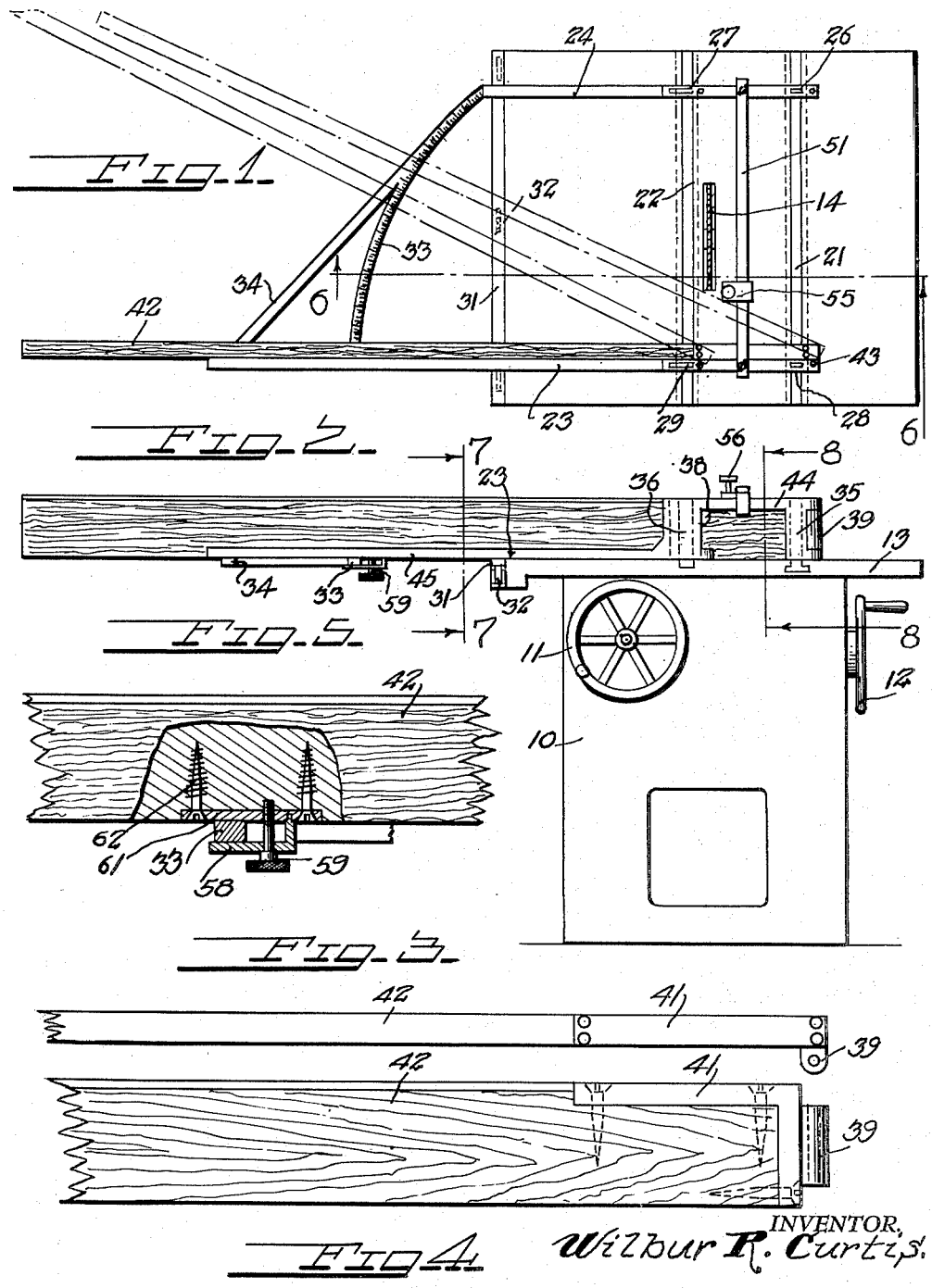
INVENTOR,
Wilbur R. Curtis.
BY
ATTORNEYS

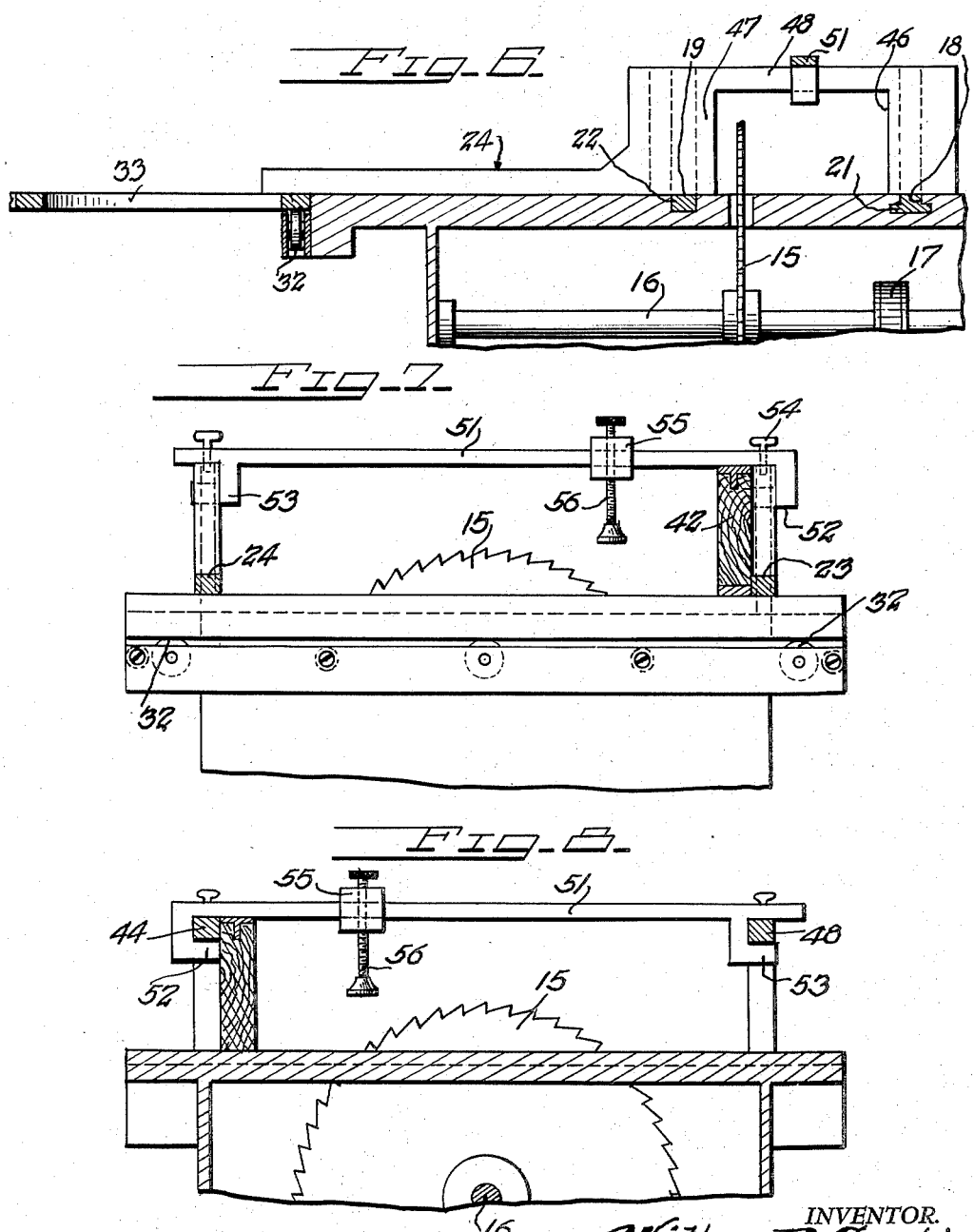

Patented Dec. 26, 1950

2,535,843

UNITED STATES PATENT OFFICE 2,535,843

TRIM AND MITER GAUGE FOR SAW TABLES

Wilbur R. Curtis, Fresno, Calif.

Application June 29, 1948, Serial No. 35,832

5 Claims. (Cl. 143—169)

1

This invention relates to a trim and miter gauge for power driven saws.

It is an object of the present invention to provide a trim and miter gauge for power driven saws which can be fitted to the saw table in grooves therein and adjusted through these grooves to effect the cut of the wood piece and wherein an arm is adjustable to position the wood piece at an angle to receive a bias cut and wherein means is provided for holding the angle arm in its adjusted position and for retaining the wood piece fixed to the gauge, the clamp for retaining the wood piece being easily removable when not desired.

Other objects of the present invention are to provide a trim and miter gauge for power driven saws, which is of simple construction, easy to move across the saw table, easy to adjust for different angles, rigid, requires minimum parts, convenient to use, inexpensive to manufacture, and efficient in operation.

For other objects, and for a better understanding of the invention, reference may be had to the following detailed description taken in connection with the accompanying drawing, in which, Fig. 1 is a top plan view of a power driven saw and of the trim and miter gauge embodying the features of the present invention.

Fig. 2 is a side elevational view of the saw and of the gauge,

Fig. 3 is a top plan view of the miter arm detached from the gauge frame,

Fig. 4 is a fragmentary side elevational view of the arm,

Fig. 5 is a fragmentary side elevational view of the arm with a portion broken away and the arm and the clamp for retaining the arm in its adjusted position on the arcuate support being shown in section, Fig. 6 is a fragmentary sectional view, in elevation, taken on line 6—6 of Fig. 1.

Figs. 7 and 8 are respectively sectional views taken on lines 7—7 and 8—8 of Fig. 2.

Referring now to the figures, 10 represents a power driven saw having the usual controls 11 and 12 and a flat top 13 with an opening 14 therein upwardly through which is projected a rotary saw blade 15 fixed to its driving arbor 16 having pulley 17. The top 13 has parallel grooves 18 and 19 disposed respectively at opposite sides of the saw 15 and serving to receive respectively guides 21 and 22. The guide 21 is of T-section in order to prevent the upward removal of the guide 21 from the top 13.

2

The ends of each guide 21 and 22 are turned upwardly to receive parallel frame members 23 and 24 each having vertically-extending holes 26 and 27 to receive these upwardly bent ends. The ends on the guide member 21 are indicated at 28. The end on the guide member 22 is indicated at 29. The slot 27 in each frame member 23 and 24 is of greater length than the slot 26 in order that the guide members can be adjusted for different variations in distances between slots 18 and 19 in the saw tops. Between the frame pieces 23 and 24, is a transverse member 31 adapted to ride on rollers 32 on the side of the flat top 13.

Also extending between the frame pieces 23 and 24 is an arcuate scale 33 and a brace 34 on which the work pieces may be rested as the saw cutting operation is effected.

The arm 23 is formed of metal and includes vertically-extending portions 35 and 36 having respectively recesses 37 and 38 for receiving hinge portion 39, Figs. 3 and 4, of a metal part 41 of a miter arm 42. A pin 43 will retain the hinge portion 39 in either one of the recesses 37 and 38, the different locations for the miter arm being illustrated in phantom in Fig. 1. The vertically-extending portions 35 and 36 are connected together at their upper ends by a connecting portion 44 sufficiently elevated to permit the saw 15 to pass beneath it as the gauge is adjusted over the saw top 13. The piece 23 has an extension 45 which is sufficiently long to receive the brace 34. The frame piece 24 is constructed similarly to frame piece 23 but is without the recesses. This piece 24 has vertically-extending portions 46 and 47 and an elevated connecting portion 48.

Between the connecting portions 44 and 48 of the respective pieces there can be secured a clamp rod 51 having depending hook formations 52 and 53 adapted to fit under the respective portions 44 and 48. A set screw 54 is provided at each end of the clamping member 51 for the securement of the member to a connecting portion. Adjustable on the clamping member 51 is a slide 55 having a clamping screw 56 adapted to engage with the work piece and secure the same to the guides 21 and 22 so that a warped portion of a work piece will be held in the position to which it has been angled and will be pressed flat and true across the saw table whereby upon cutting a rabbet or dado a uniform depth of cut will be effected.

The miter arm can be retained upon the arcuate scale 33 by an angle clamp 58 (Figures 2 and 5)

held by a screw 59 against the scale 33 on the upper side of which engages a wear plate 61 secured by screws 62 to the bottom of the miter arm. This screw 59 is loosened when it is desired to adjust the arm.

While various changes may be made in the detail construction, it shall be understood that such changes shall be within the spirit and scope of the present invention as defined by the appended claims.

What is claimed is:

1. A trim and miter gauge for a rotary saw comprising parallel members adapted to fit parallel grooves in a table top of a rotary saw machine, frame pieces extending transversely of the parallel members and connected to the same, at least one of said frame pieces being formed to permit the passage of the rotary saw between the ends of said frame piece, a scale extending between the frame pieces, a miter arm pivotally connected to one of the frame pieces and adjustable over the scale, and releasable means for fixing the miter arm to the scale.

2. A trim and miter gauge for a rotary saw comprising parallel guides adapted to fit recesses on the rotary saw table top and slidable therein, each of said guide members bent upwardly at their opposite ends, frame pieces having vertically-extending portions with vertically-extending openings receiving the upwardly bent ends of the guides, a connecting portion extending between the upper ends of the vertical portions of each frame piece and sufficiently elevated to pass over the rotary saw, said frame pieces having extensions to one side, braces extending between the frame pieces laterally removed from the guides, a scale on one of the braces, a miter arm pivotally connected to one of the vertically-extending portions of one of the frame pieces and adapted to be adjusted over the scale, and means for fixing the miter arm to one of the braces in its angularly adjusted position.

3. A trim and miter gauge for a rotary saw comprising parallel guides adapted to fit recesses on the rotary saw table top and slidable therein, each of said guide members bent upwardly at their opposite ends, frame pieces having vertically-extending portions with vertically-extending openings receiving the upwardly bent ends of the guides, a connecting portion extending between the upper ends of the vertical portions of each frame piece and sufficiently elevated to pass over the rotary saw, said frame pieces having extensions to one side, braces extending between the frame pieces laterally removed from the guides, a scale on one of the braces, a miter arm pivotally connected to one of the vertically-extending portions of one of the frame pieces and adapted to be adjusted over the scale, and means for fixing the minor arm to one of the braces in its angularly adjusted position, and the frame piece to which the miter arm is pivotally connected having a formation on its other vertically-extending portion for receiving the miter arm, whereby the miter arm can be selectively connected to different locations on the frame piece.

4. A trim and miter gauge as defined in claim 2 and a clamp rod having formations on the opposite ends of the same for the releasable connection of the clamping rod with the respective connecting portions of the frame pieces, a slide on the clamping rod, a clamping screw adjustable in the slide and adapted to engage a work piece to secure the work piece in its adjusted position on the guides.

5. A trim and miter gauge as defined in claim 2, in which rollers are journaled to a side of the rotary saw table top and one of said braces is mounted to ride on said rollers.

WILBUR R. CURTIS.

REFERENCES CITED

The following references are of record in the file of this patent:

UNITED STATES PATENTS

| Number | Name | Date |
|---|---|---|
| 271,408 | Brennan | Jan. 30, 1883 |
| 1,452,233 | Zsuffa | Apr. 17, 1923 |
| 1,662,608 | Hill | Mar. 13, 1928 |
| 1,894,010 | Tautz | Jan. 10, 1933 |
| 2,085,235 | Tautz | June 29, 1937 |